Feb. 20, 1962 E. R. BERENDS ETAL 3,021,879
ADJUSTABLE INDEXING MECHANISM
Filed April 27, 1959 5 Sheets-Sheet 3

INVENTOR
EMERSON R. BERENDS
REX P. DEGHUEE

BY Strauch, Nolan & Neale
ATTORNEYS

Feb. 20, 1962

E. R. BERENDS ETAL 3,021,879

ADJUSTABLE INDEXING MECHANISM

Filed April 27, 1959

INVENTORS
EMERSON R. BERENDS
REX P. DEGHUEE

BY Strauch, Nolan & Neale

ATTORNEYS

United States Patent Office 3,021,879
Patented Feb. 20, 1962

3,021,879
ADJUSTABLE INDEXING MECHANISM
Emerson R. Berends, Tupelo, and Rex P. Deghuee, Amory, Miss., assignors to Rockwell Manufacturing Company, Pittsburgh, Pa., a corporation of Pennsylvania
Filed Apr. 27, 1959, Ser. No. 809,004
17 Claims. (Cl. 143—6)

The present invention relates to indexing mechanism for accurately positioning relatively rotatable or movable elements and more particularly to an adjustable indexing mechanism adapted for factory preadjustment of predetermined angular or relative longitudinal positions of a pair of machine parts, such as the support arm and rotatable trackway of a radial arm saw or the movable carriage along the trackway, at the frequently used relative positions of the tool parts.

While indexing mechanisms of various construction have been previously proposed and widely used, particularly in the machine tool art, no adjustable indexing mechanisms except those of United States Letters Patent 2,590,-119 to E. J. Osterhus dated March 25, 1952, and 1,956,835 to R. R. Roemer dated May 1, 1934, are known to applicant and neither of these provides adjustable mechanism adapted to permit factory preadjustment to assure exacting positioning of the relatively adjustable members at predetermined positions.

It, accordingly, is the primary object of the present invention to provide an indexing mechanism wherein several selected relative positions of a pair of members may be respectively preadjusted to assure permanently accurate indexing of the relative movable parts at selected positions.

A still further object of the present invention is to provide an indexing mechanism wherein a socket member is relatively adjustably positionable on one of the members to be indexed and an axially and rotatably mounted cooperating indexing pin is mounted on the other member with its axis eccentrically related to the axis of the socket member so that predetermined accurate indexing cooperation of the pin and socket members is obtainable.

Further objects will appear from the following description and appended claims when read in conjunction with the accompanying drawings wherein:

Figure 3:
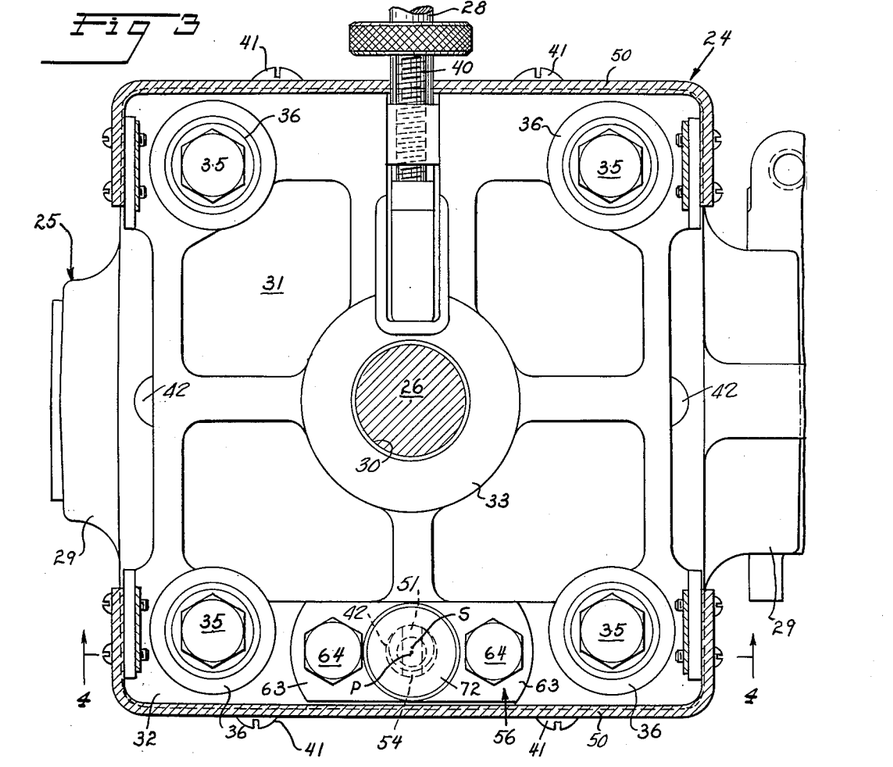
FIGURE 3 is a vertical sectional view through the trackway supported carriage taken substantially on line 3—3 of FIGURE 1 looking in the direction of the arrows and illustrating the relatively rotatable carriage and yoke structure viewed in the direction of the arrows.
Figure 4:
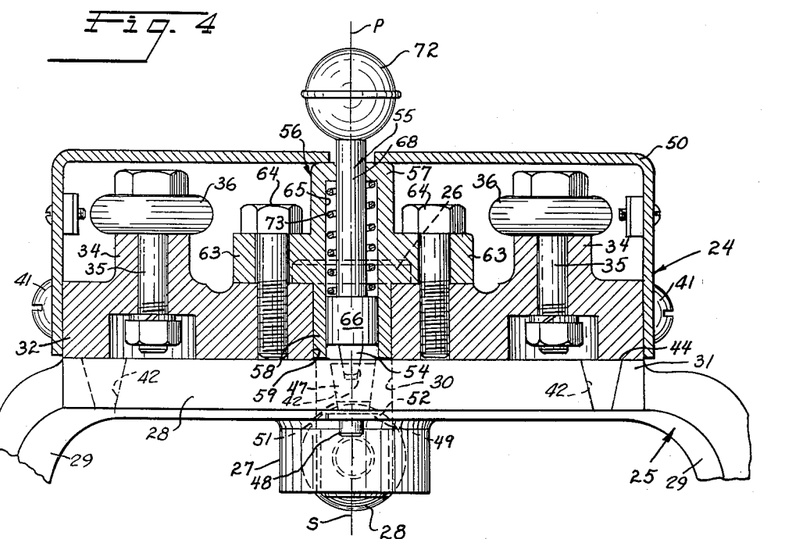
FIGURE 4 is a fragmental sectional view taken substantially along lines 4—4 of FIGURE 3 looking in the direction of the arrows.

With continued reference to the drawings wherein the indexing mechanism of the present invention will be described in detail as used on a radial arm saw, the numeral 10 generally designates a radial arm saw made up of a support base 11, a work table 12, a tubular post standard 13 axially slidably mounting a support post or column 14 carrying at it upper end a radially extending support arm 15 disposed in vertically spaced upwardly overlying relation to table 12. As clearly appears from FIGURE 1, column 14 is non-rotatably associated with standard 13 by means of a key spline 16 engaged with a suitable keyway groove formed in the standard 13 in well known manner. At its outer free end arm 15 is provided with a cylindrical mounting pad 17 carrying in a vertically extending, coaxially arranged through bore (not shown) a journal pin 18 adapted to fit a journal bore in a mating mounting pad 19 of a supporting trackway 21 journalled for angular rotation with respect to arm 15 and table 12 in conventional manner. As clearly seen from FIGURES 1 and 2, the upper end of journal pin 18 threadedly receives a clamp nut 22 having an integrally connected lever arm 23 extending radially therefrom and terminating in a hand grip of spherical form. Preferably arm 15 is longitudinally centered with respect to table 12 and the axis of pivot pin 18 is disposed to coincide with the geometrical center of the work support face of table 12. Arm 15 and post 14 are adapted to be vertically raised and lowered in unison by a lever mechanism 20 in well known manner. Rotation of trackway 21 around the pivotal axis of pin 18 enables the trackway to be disposed at any selected angular relationship with respect to both table 12 and the coaxially related mounting pad 17 of radial support arm 15 in well known manner. Trackway 21 in any suitable manner, for example, in the manner illustrated in United States Letters Patent 2,773,524 to Schutz et al. dated December 11, 1956 (see FIGURES 6 and 7) or the external track-internal roller structure of FIGURES 1 through 4, supports a reciprocable tool carriage 24 which in turn supports a tool supporting yoke 25 thereon for relative angular rotation about the axis of a centered journal pin 26. As best seen from FIGURES 1, 3 and 4, carriage 24 supports yoke 25 from a headed pivot screw 26 the lower end of which is threaded to receive a clamp nut 27 having a radially extending integral lever arm 28 terminating in a spherical hand grip (FIGURE 2). As clearly appears from FIGURES 3 and 4, yoke 25 has a main rectangular body portion carrying at the centers of two diametrically opposite sides depending support arms 29 and formed at its center with a support pin through bore 30. The body portion forms a mounting pad 31. Carriage 24, as best seen in FIGURES 3 and 4, is made up of a generally rectangularly shaped spider armed plate 32 formed at its center with an annular mounting portion 33 and provided along its laterally opposed corners with integral, upstanding, roller support journal bosses 34. Stub axles 35 for journalling carriage wheels 36 are provided to movably suspend carriage 24 from the laterally outwardly directed tracks 37 of trackway 21. The opposite ends of trackway 21 are closed by end plates 38 bolted to the end faces of trackway 21 by cap screws 39. A tapped boss centered midway along one side web of plate 32 threadedly receives the threaded shank of a clamp screw 40 adapted to selectively lock carriage 24 to trackway 21 when the saw is used for ripping or other purposes requiring a stationary carriage. The opposite lateral edges of body plate 32 are respectively closed by metal cover plates 50 bolted to the side edges of plate 32 by cap screws 41.

Figure 8:
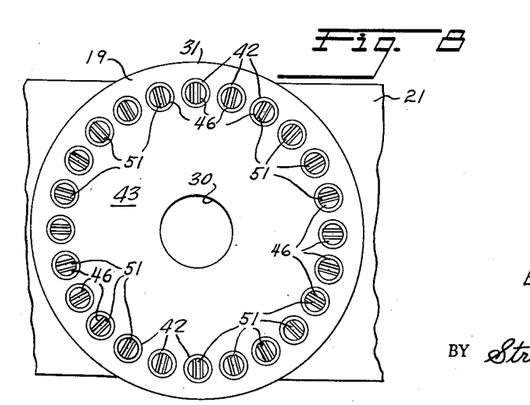
FIGURE 8 is a fragmental top plane view of the trackway of the saw of FIGURE 1 showing the mounted pad provided with a multiplicity of adjustable indexing socket assemblies provided in accord with the present invention.

The annular, upstanding, longitudinally centered mounting pad 19 of trackway 21 is normally provided with a multiplicity of vertically directed conical openings 42 (FIGURE 8) arranged in diametrical pairs oriented to the axes of pad 19. Similarly pad 31 of yoke 35 is normally provided with four 90° angularly related conical openings 42 (FIGURE 3) arranged in diametrical pairs oriented to the axes of the conventional yoke journal openings located at the lower ends of yoke arms 29 for supporting the conventional motor pivot pins (not shown). Since the openings 42 in each pad are identical and identically related to the respective upper and lower faces of pads 19 and 31, only one set will be described in detail, namely, those of pad 31 illustrated in FIGURES 3 and 4. Referring first to FIGURE 4, the larger ends of openings 42 open through the upper face 44 for a purpose presently to be pointed out. As best seen in FIGURE 3, the conical openings 42 are angularly disposed around the axis of the bore 30 and along the path of a circle generated around the axis of the pivot pin bore 30 as a center using a suitable predetermined radius length. While any number of conical openings may be provided as indicated in FIGURE 8, it is contemplated that such openings be provided in pad 31 only at the major angular locations that are frequently used. In a tool such as the illustrated radial arm saw, it is contemplated that trackway pad 19 be provided with nine angularly spaced openings 42 throughout the front half of its surface area with one opening lying in the plane of the longitudinal axis of trackway 21, diametrically opposed openings located at right angles to the longitudinal axis of the trackway and additional openings located between these openings at the 30, 60 and 45 degree angular poistions. With respect to pad 31, the openings may be located either at the previously described positions or at each 15 degree angular position around pad 31 so that the tool supporting yoke when, supporting a drill, may be rapidly located at any one of the major 15 degree angular positions throughout the 360° circle to drill a series of circularly related drilled holes.

Figures 5, 7:
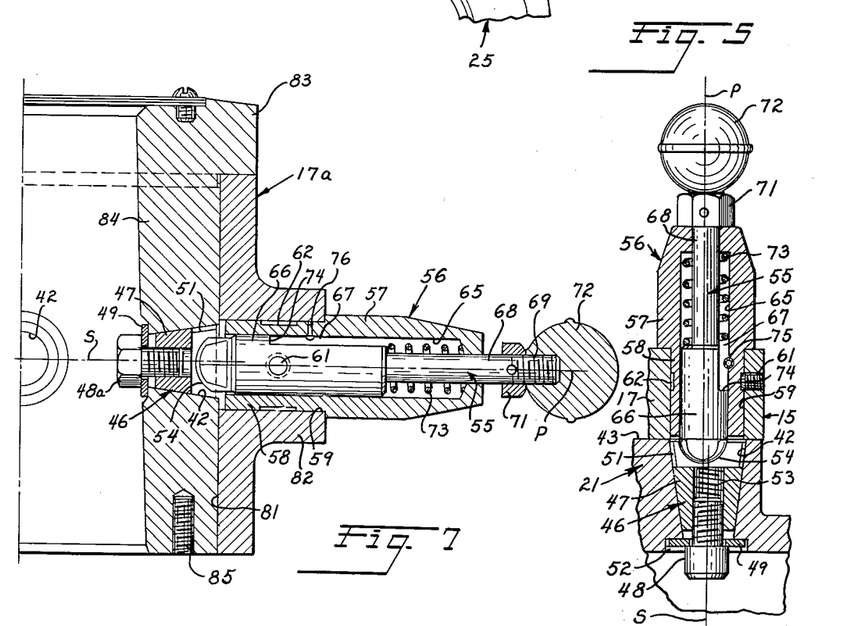
FIGURE 5 is a fragmental sectional view taken along lines 5—5 of FIGURE 2 looking in the direction of the arrows.
FIGURE 7 is a fragmental sectional view taken along lines 7—7 of FIGURE 6 as viewed substantially in the direction of the arrows.

Each of the conical openings 42 in pad 19 and in pad 31 is fitted with a removable socket assembly 46 of identical construction. Each socket assembly 46 is composed of a socket member in the form of a plug 47 in the shape of a frustum of a cone, a headed clamp screw 48 and an abutment washer 49. As best seen in FIGURES 4 and 5, the latter figure illustrating the identical socket assembly 46 employed in pad 19 as illustrated in FIGURES 2 and 5, the larger end of each plug 47 is located adjacent the plane of the upper pad face and is provided with a diametrically extending slot 51 the purpose of which will presently appear. As best seen from an inspection of FIGURE 5, each washer 49 is seated in a spot-faced recess 52 concentrically related to the axes of the respective conical openings 42 and the threaded shank of the clamp screw 48 is threaded into a tapped bore 53 coaxially formed in the body of plug 47. The screw head may either be of hexagonal (FIGURE 4), round (FIGURE 5) or any other desired configuration, the sole consideration being the manner in which access is most conveniently provided for making the required adjustment. Preferably the axial length of plug 47 is somewhat less than that of conical opening 42 and the head of screw 48 sufficiently exceeds in diameter the diameter of the screw shank to abuttingly overlie the central portion of washer 49 when screw 48 is screwed home in plug 47. As a consequence, threading screw 48 in plug 47 will impart relative opposite axial movement to plug 47 and washer 49 to first cause washer 49 to bottom in recess 52 and thereafter cause plug 47 to be drawn axially inwardly of conical opening 42 effecting a tight clamped relationship between the peripheral conical wall of plug 47 and the opposing conical wall of opening 42. It will be appreciated, therefore, that socket assembly 46 provides means for adjustably angularly positioning each plug 47 in its respective conical opening 42.

The series of adjustable socket assemblies is adapted to be engaged by the nose end 54 of a single axially and rotatably movable indexing pin 55 carried respectively by mounting pad 17 of arm 15 and the other lateral side edge of plate 32 of carriage 24. As will be clear from an inspection of FIGURES 3 and 4 and comparison with FIGURE 5, the respective centers S and P of socket assembly 46 and indexing pin 55 lie along a radius originating at the respective common journal axes of pins 18 and 26 and are respectively radially offset slightly from one another. Nose 54 of pin 55 is furthermore formed at the free end of an enlarged pin body portion of original hemispherical configuration by a straddle milling operation to provide a generally diametrically extending protuberant rib-like nose portion having opposite flat sides spaced to freely but closely fit between the side walls of plug grooves 51 and curved ends as will be clear from a comparison of the identical pin structures illustrated in FIGURES 4 and 5 and the exploded perspective illustration of FIGURE 11. While the side walls of slots 51 and nose 54 may be formed parallel to the plug and pin axes respectively they preferably are inclined as shown in FIGURE 4 to provide a wedged engagement. It follows, therefore, that nose 54 cooperates with the generally diametrically directed slot 51 of a selected socket assembly as clearly illustrated by the relatively right angularly disposed illustrations in FIGURES 4 and 5. Furthermore, due to the offset relation of the respective centers S and P, rotation of pin 55 and an associated loosened socket assembly 46 mounted in either trackway mounting pad 19 or yoke mounting pad 31 will effect micrometer relative angular movement of trackway 21 relative to radial support arm 15 on the one hand and yoke 25 relative to carriage 24 on the other hand.

While pin 55 may be mounted in any suitable manner, it preferably forms the manually movable element of an indexing pin assembly 56 made up of a mounting sleeve 57 having a reduced diameter terminal portion 58 adapted to snugly fit a bore 59 formed in the mounting pad 17 of arm 15 (FIGURE 5) or the rectangular plate 32 of carriage 24 (FIGURES 3 and 4) and retained in assembled relation either by a set screw 61 cooperating with an angular groove 62 formed in the periphery of reduced diameter portion 58 or lateral flanges 63 bolted to plate 32 by clamp screws 64. As clearly appears from FIGURES 4 and 5, sleeve 57 is provided with a coaxial bore 65 slidingly receiving enlarged pin body portion 66 of pin 55 formed immediately adjacent nose 54 and notched at one side as shown at 67. Pin 55 immediately above body 66 is formed with an elongated stem 68 of smaller diameter than body 66 threaded at its free end 69 (FIGURE 7) to receive a nut 71 pinned to pin 55 and spherical hand grip knob 72 (FIGURES 5, 6, 7, and 9) or spherical hand grip knob 72 alone (FIGURES 3 and 4). Axial bore 65 surrounding the pin stem 68 defines a chamber receiving a compression spring 73 having one end abutting the bottom wall of recess 65 and its other end abuttingly engaging the enlarged diameter body portion 66 of the pin so as to normally bias pin 55 toward its operative position with nose 54 protruding from the end of sleeve 57. Sleeve bore 65 in the area of notch 67 and inwardly from the pin shoulder 74 formed by notch 67 is provided with a rotation limiting protuberance in the form of either a roll pin 75 (FIGURE 5) or a rivet or drive screw 76 (FIGURE 7) suitably fixed in a drilled aperture in sleeve 57. This rotation limiting means limits the rotation of pin 55 to an angle substantially less than 180° so that the same side wall engagement between slot 51 and tongue 54 occurs upon repeated indexing operation insuring accurate indexing in spite of possible eccentricity of the tongue or rib 54 due to the straddle milling operation forming it.

Figure 6:
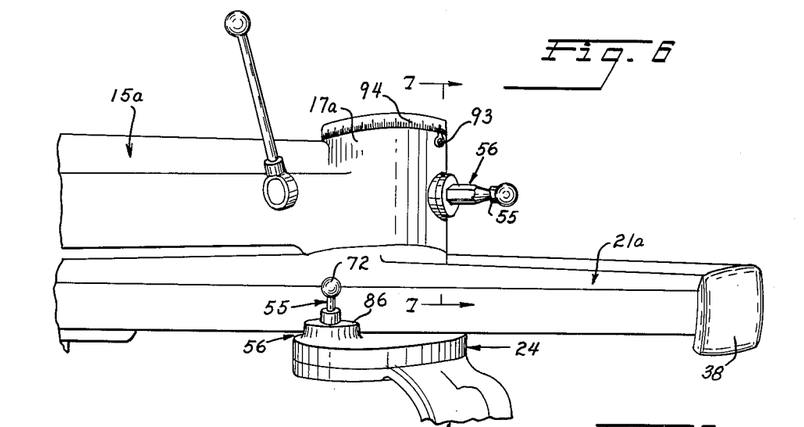
FIGURE 6 is a fragmental perspective view of a modified radial arm saw provided with the indexing mechanism of the present invention viewed from the front of the radial support arm.

Referring to FIGURES 6 and 7, application of the present invention to a radial arm saw having a different carriage and trackway pivot construction necessitating a radially disposed indexing assembly is illustrated. In this form of the invention, the radial support arm 15 is replaced by radial support arm 15a having a cylindrical mounting boss 17a at its free end and a trackway 21a having internal tracks (not shown) movably supporting carriage 24 and its associated tool supporting yoke 25. In this embodiment of the invention, a cylindrical mounting boss 17a is formed with a through bore 81 and is provided with a pin mounting boss 82 protruding from the front cylindrical sidewall of boss 17a. Boss 82 is provided with an axial bore 59 for mounting the indexing pin assembly 56 at right angles to the pivot axis of the trackway. The pin assembly in this form of the invention is identical to that heretofore described. The journal pivot for trackway 21a is formed by a hollow sleeve 83 having a body portion 84 snugly fitting a vertical bore 81 formed in boss 17a and an enlarged terminal end overlapping the upper end face of boss 17a. Body portion 84 approximately midway between its ends is provided with an annularly spaced series of socket openings 42 the axes of which lie in a horizontal plane containing the axes S of the sockets (FIGURE 7) and lying parallel to the work table conventionally disposed in spaced relation below the radial support arm 15a. As in the previously described embodiment of this invention the axis of the pin 55 is offset to one side of the plane containing the socket axes, axially downwardly as illustrated in FIGURE 7. Here again this offset relationship assures micrometer rotational movement of the journal sleeve 83 and trackway 21a, which is bolted to sleeve 83 by means of mounting screws (not shown) threaded into the annularly spaced tapped apertures 85 provided in the lower end face of journal sleeve 83, upon rotation of pin 55 and its engaged socket assembly in the manner heretofore pointed out.

The yoke 25 is also pivotally suspended from carriage 24 in this form of the invention in substantially the same manner as has been heretofore described and the carriage 24 is formed with a mounting boss 86 for mounting an indexing pin assembly 56 of the character heretofore described.

While the trackway mounting pads illustrated are provided throughout the front half only with socket assemblies 46, it is to be understood that such socket assemblies may be provided throughout the entire 360° area of these pads.

Since the purpose of the adjustable indexing mechanism of this invention is to assure accurate positioning of the relatively movable parts, an initial starting point is first established. While this may be done in various ways depending upon the nature of the relatively movable parts, it is usually accomplished in the machine tool field by establishing by trial and error a particular parallel or right angular relationship between a tool and a work table or a workpiece properly supported in position to be worked on by the tool. In the illustrated saw structures, the trackways 21 or 21a are respectively generally lined up with their respective support arm indexing pins 55 cooperating with their respective trackway socket assemblies 46 which most nearly locates the respective trackways in lateral parallelism to their respective support arms 15. The individual yokes 25 are also respectively generally lined up with their respective carriage indexing pins 55 cooperating with the yoke socket assembly 46 which most nearly locates the yoke arms in lateral parallelism to the trackway. The respective engaged socket assemblies 46 are then sequentially loosened, the trackway assemblies 46 being first loosened and support arm indexing pins 55 being rotated until the trackways 21 and 21a are disposed with their tracks at right angles to the upstanding faces 91 of table fence 92. When this angularity is obtained, the clamp screws 48 of the trackway socket assemblies 46 are screwed home to lock the engaged socket assemblies in their adjusted positions. The adjustable pointer 93 carried by the support arm 15 is then clamped in position to coincide with the zero mark of the graduated angle scale 94 secured to trackway pad 19 (FIGURES 1 and 2) or formed on the peripheral face of the journal sleeve 83 or other annular movable trackway element.

A test workpiece is then placed on the table and a test cut is made into the workpiece by moving the carriage along the trackway. If the plane of the blade lies at an angle to the path of movement of the carriage along the trackway so as to prevent proper tracking of the blade, the yoke socket assembly 46 is loosened and the required angular adjustment is made to secure proper tracking and eliminate the heel from the blade.

This procedure is then repeated with the opposed 90° angularly related socket assemblies of the yoke and the trackway and finally with the 45° angularly related socket assemblies, the 30° angularly related socket assemblies and the 15° or other smallest angularly related socket assemblies of the trackway.

Preferably these additional adjustments of trackway socket assemblies 46 for the 45°, 60° and 30° positions could be readily tied into the scale graduations by rotation of the trackway until pointer 93 lies at the 45°, 60° and 30° scale markings, making a cut on a workpiece, testing the angle of the cut with respect to fence face 91 and adjusting the appropriate socket assembly 46 until the proper angular relationship to face 91 is obtained. Once all adjustments have been made as just described, the present mechanism will assure accurate indexing at every selected angular adjustment until loosening of an individual socket assembly and relative rotation in its conical opening takes place.

Figure 1:
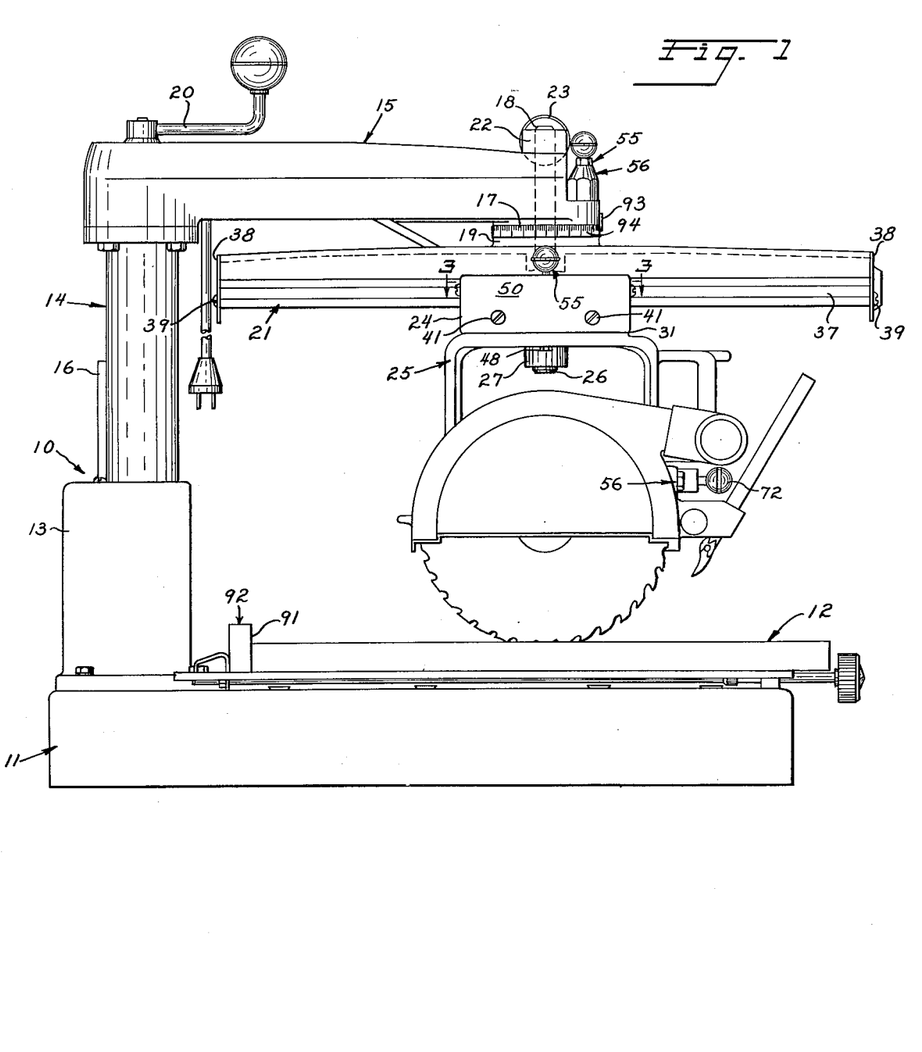
FIGURE 1 is a side elevational view of a radial arm saw embodying an indexing mechanism made in accord with this invention for both indexing of the trackway and indexing of the tool supporting motor and yoke member carried by the trackway.
Figures 2, 11:
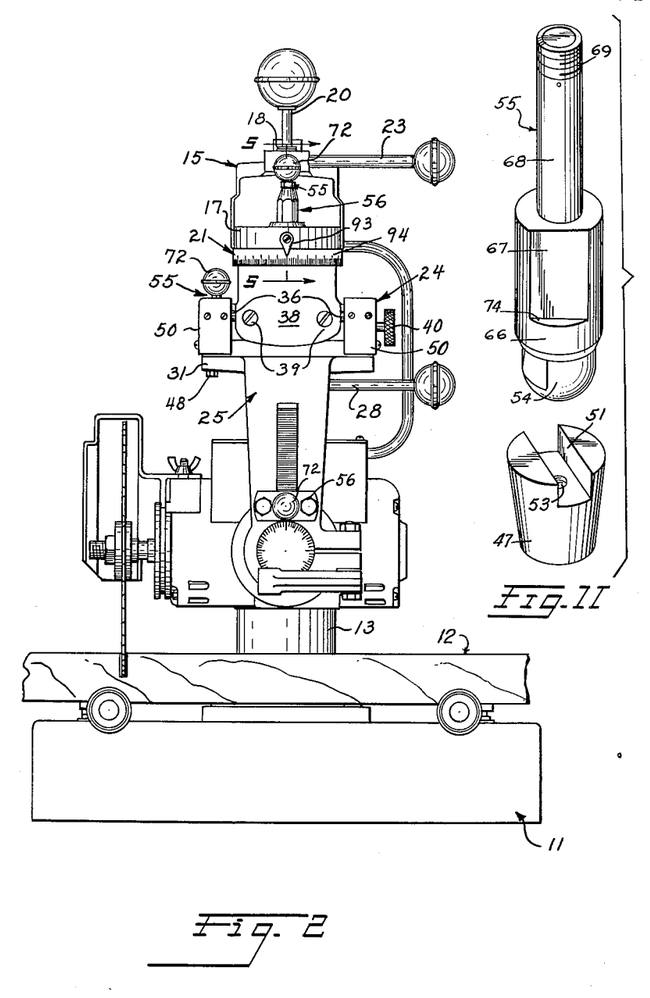
FIGURE 2 is a front elevational view of the radial arm saw of FIGURE 1.
FIGURE 11 is an exploded perspective view of the socket plug and cooperating indexing pin employed in FIGURES 1 through 8.

The indexing mechanism is, of course, readily applicable to the yoke journal mounting of the tool assembly for indexing bevel cutting of workpieces, the indexing pin assembly being mounted on one of the yoke arms as indicated in FIGURES 1 and 2.

While the socket assemblies 46 and cooperating pins 55 heretofore described respectively comprise conical plugs 47 providing pin receiving, diametrically related, end face slots 51 and pins 55 having protuberant, diametrically related, rib-like nose ends 54, it is to be understood that any suitable mating interfit of the socket assemblies and pins may be employed, if desired, so long as the essential relative movement of the members to be indexed is obtained by conjoint rotation of the socket assemblies and pins in their respective mountings is effected. It is to be further understood that micromatic relative adjusting movement of members constrained for movement along paths other than rotational or orbital paths may be effected by the indexing mechanism of the present invention. To illustrate such modifications of the socket assemblies and pins and the versatile nature of the adjustable indexing mechanism of this invention, reference is made to FIGURES 9 and 10 illustrating the indexing mechanism applied to indexing relatively longitudinally movable members.

Figure 9:
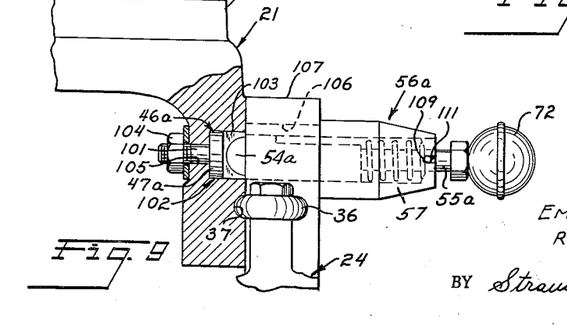
FIGURE 9 is a fragmental transverse sectional view through a trackway similar to that of FIGURE 1 provided with longitudinal spaced indexing socket members of the present invention arranged for engagement by a carriage mounted index pin.
Figure 10:
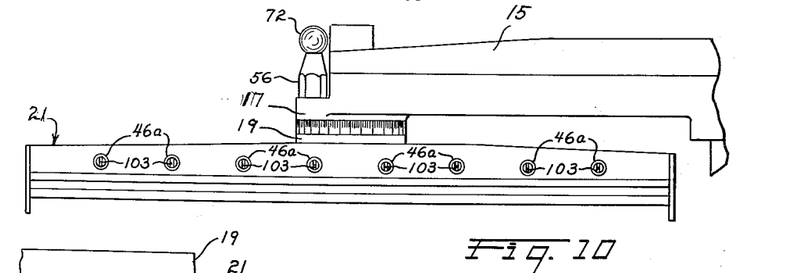
FIGURE 10 is a side elevational view of the radial arm saw trackway of FIGURE 8 showing the longitudinal disposition of the socket members.

As shown in FIGURES 9 and 10, the indexing mechanism is applied to establishing major location points along the trackway 21 of a radial arm saw where the carriage might desirably be positioned for certain operations such as ripping a workpiece into predetermined width strips with a circular saw tool mounted on the yoke, drilling holes in side-by-side predetermined spaced relation in a workpiece with a drilling tool mounted on the yoke and similar operations. In such usage of the indexing mechanism, the trackway 21 is provided along one sidewall with longitudinally spaced socket assemblies 46a. Each assembly 46a comprises a plug 47a in the form of a threaded stem 101, an enlarged cylindrical plug-like body 102 one end face of which is provided with a diametrically extending protuberant rib 103 and a lock washer and nut assembly 104 for adjustably clamping the socket assembly 46a in the stepped openings 105 provided in the trackway sidewall. The cooperating pin assembly 56a is mounted on the carriage 24, preferably in the mounting bore 106 of an upstanding mounting ear 107 formed on or secured to carriage 24 midway of the ends of the upwardly directed face of one of its lateral marginal edges. Pin assembly 56a is identical to the previously described pin assemblies 56 except that nose end 54a of its pin 55a is diametrically slotted rather than straddle milled to adapt it for operative cooperation with the rib 103 of the socket assemblies 46a.

As in the previously described indexing mechanisms, the axes P and S of the relatively movable pin 55a and plug 46a are suitably offset from one another, vertically as shown in FIGURE 9. It follows, therefore, that upon loosening of lock washer and nut assembly 104 of a selected socket assembly 46a and engagement of pin 55a therewith, rotation of pin 55a and the engaged socket assembly 46a will effect micromatic longitudinal movement of carriage 24 along trackway 21. Assuming that the socket assemblies are spaced at three inch intervals measured forwardly from fence 92, a saw mounted on yoke 25 can be quickly indexed to rip a workpiece to provide 3 inch to 24 inch strips by suitable selection of the appropriate socket assembly 46a.

If a drill be mounted on the yoke in place of the saw using a suitable conversion attachment (not shown), a series of accurately aligned drill holes could be readily drilled longitudinally, at a desired inclination or crosswise of a workpiece supported on table 12 depending upon the angular position of trackway 21 at accurately determined 3 inch intervals. These operations could be performed with a minimum of operational skill and attention using the factory presettable indexing mechanism of this invention since the spring biased pin need only be disengaged from one socket member and engaged with the next socket member and automatic alignment and spacing would be assured by the factory built in accuracy provided by the indexing mechanism of this invention usable (1) to adjust the yoke to effect a blade heel adjustment or assure true parallelism between the trackway and the related longitudinal path of the associated tool, (2) to effectively establish accurate swing angles of the trackway about its pivot axis, (3) to effectively establish accurate swing angles of the tool in its yoke mounting and finally (4) to effectively establish accurate position points of the carriage along the trackway.

The pin 55 in all forms of the invention is preferably provided with a radially outwardly protruding lock-out pin 109 (FIGURE 9) selectively adapted to cooperate with an axial slot 111 formed at the outer end of mounting sleeve 57 to condition the indexing mechanism for operation or to abuttingly engage the end face of sleeve 57 to render the indexing mechanism inoperative when free relative rotation or relative longitudinal reciprocation of the relatively movable members is desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An adjustable multiposition indexing mechanism for a pair of members interconnected for relative movement along a constrained path and having opposed relatively movable surface areas comprising a plurality of socket members mounted in one of said members in spaced relation centered along a center line in its opposed movable surface area determined by the path of relative movement of said members, said socket members comprising plug-like elements mounted in said one of said members for respective rotational movement around a respective axis intersecting said center line; a pin mounted in the other of said members for axial movement in and out of the opposed movable surface area of said other member, said pin being positioned for selectively entering any of said plurality of plug-like elements along an axis offset to one side of said center line in the opposed movable surface area of said one of said members and providing an eccentric engagement contact with a selected plug-like element whereby said relatively movable pair of members will have a predetermined relative position when said pin is engaged with a respective plug-like element; and means individual to each plug-like element for releasably clamping the respective plug-like elements in a preselected relative position to said one relatively movable member whereby upon releasing actuation of said releasable clamping means of the selected plug-like element and engagement of said pin in the released plug-like element the predetermined relative position of said relatively movable members determined by said pin and said released plug-like element may be finely adjusted upon rotation of said pin to shift the eccentric engagement contact between said pin and the released plug-like element.

2. The mechanism of claim 1 wherein said pair of members is mounted for relative rotation and the axes of said pin element and said series of individual plug-like elements parallel the journal axis of said pair of members and the axes of said plug-like elements define a path of movement forming a surface of revolution having said journal axis as a center.

3. The mechanism of claim 1 wherein said pair of members is mounted for relative rotation and the axes of said pin element and said series of individual plug-like elements are disposed along respective radii extending outwardly from said journal axis of said pair of members and intersecting said journal axis at right angles.

4. The mechanism of claim 1 wherein each of said socket members comprises a frustum of a cone the larger end of which constitutes the pin opposed end and the smaller end of which has a tapped bore opening therethrough, wherein said other of said pair of members is provided with a series of conical bores the larger ends of which intersect the relatively movable surface of said other of said pair of members and the smaller ends of which intersect an oppositely facing surface of said other of said pair of members and are each surrounded by an annular counterbore and respective clamp means are provided for each of said socket members and comprise respective washers disposed in said counterbores and respective headed screws the shanks of which extend freely through a respective washer and are threadedly engaged in the respective tapped socket bores whereby upon threading said respective headed screws home in their bores the shoulder formed at the shank end of each screw will bear against the exposed face of its associated washer to seat said respective washers in their counterbores and draw said respective socket members into peripheral clamping engagement with their associated conical bores to secure each socket member in individually predetermined angular relation in its associated conical bore.

5. The mechanism of claim 1 wherein each of said socket members comprises a plug having ends of different cross-sectional area mounted with the larger end opposed to said pin, wherein said other of said pair of members is provided with a series of through bores each formed to matingly receive a respective plug and retain it with its larger end intersecting the relatively movable surface of said other of said pair of members, respective clamp means engageable with the smaller ends of each of said plugs and adapted to selectively fix said sockets in said through bores in individually predetermined angular relation.

6. The mechanism of claim 1 wherein said pair of members are mounted for relative movement along a longitudinal path and the axes of said pin element and said series of individual plug-like elements parallel each other and are disposed at right angles to the opposed relatively movable surface areas of said pair of members and the axes of said plug-like elements define a plane extending along said longitudinal path.

7. An adjustable socket assembly for mounting in a conical socket bore of one of a pair of relatively rotatable members to form an individually adjustable socket for cooperating engagement with an indexing pin axially and rotatably mounted in the other of said relatively rotatable members comprising a plug in the form of a frustum of a cone having a peripheral wall dimensioned to matingly seat in said socket bore, a generally diametrically disposed pin groove in its larger end and a generally axially directed tapped bore opening through its smaller end; a clamp washer of greater diameter than the smaller end of said plug; and a headed clamp screw having a threaded shank dimensioned to freely pass through said washer and threadedly engage in said axially directed tapped bore and an integral head defining at its shank end an annular shoulder dimensioned to overlap the central portion of said washer whereby upon insertion of said plug in said conical socket bore, assembly of said washer and headed screw with respect to said axially directed tapped bore and smaller end of said plug and threading of said screw home in said tapped bore said washer will first be forced into contact with said one rotatable member and thereafter said plug will be drawn axially toward said washer into peripherally clamped engagement in said bore.

8. An adjustable multi-position indexing mechanism for use with a rotatable trackway journalled on a radial support arm of a radial arm saw for rotation around a vertical journal axis comprising a multiplicity of socket members rotatably mounted in said trackway in predetermined angularly spaced relation around said journal axis and having socket recesses lying along the path of a circle having said journal axis as a center and in a surface area disposed in opposed relation to a surface area of said radial support arm, means adjustably securing said socket members to said trackway for respective relative rotation with respect to said trackway surface area whereby the angular relationship of said respective socket recesses to said surface area of said trackway may be selectively adjusted; and an indexing pin axially and rotatably mounted in said radial support arm with its axis of rotation normal to said surface area of said trackway and offset to one side of said path of a circle and having an end face formed to matingly cooperate with and shift laterally with respect to said socket recesses whereby upon loosening of the securing means of a selected socket member and engagement of said indexing pin therewith micromatic relative angular adjustment of said trackway relative to said radial support arm around said journal axis may be effected upon rotation of said indexing pin and said socket relative to said trackway.

9. The mechanism of claim 8 wherein the axes of said pin element and said multiplicity of socket members parallel the journal axis of said pair of members and the axes of said socket members define a path of movement forming a surface of revolution having said journal axis as a center.

10. The mechanism of claim 8 wherein the axes of said pin element and said multiplicity of socket members are disposed along respective radii extending outwardly from said journal axis of said pair of members and intersecting said journal axis at right angles.

11. An adjustable multi-position index mechanism for use with a member movable along a trackway extending longitudinally of a supporting member comprising a multiplicity of socket members rotatably mounted in said supporting member in predetermined longitudinally spaced relation with their axes parallel and spaced along the trackway in a common plane and having end faces disposed to oppose said movable member during its relative movement and having diametrical formations therein; means adjustably securing said socket members to said supporting member for respective relative rotation with respect to said supporting member whereby the angular relationship of said respective socket member diametrical end formations to said supporting member may be selectively adjusted; and an indexing pin axially and rotatably mounted in said movable member with its axis of rotation paralleling the axes of said socket members and offset to one side of said common plane and having an end face opposing and formed to matingly cooperate with the diametrical formations of said socket member end faces when said movable member is suitably longitudinally related to said support member, said indexing pin being adapted when engaged with a loosened socket member and rotated around its axis to effect related rotation of the engaged socket member and micromatic relative longitudinal adjustment of said movable member relative to said support member and accurate indexing adjustment of said movable member to a predetermined position along said support member.

12. An adjustable index pin engaging socket assembly for mounting in one of a pair of relatively movable members to form an individually adjustable socket assembly for mating cooperating interengagement with an indexing pin axially and rotatably mounted in the other of said pair of relatively movable members in position to be brought into opposed relation to one end of said socket assembly comprising a rotatable plug-like member having opposite end portions of different diameter adapted to be rotatably received in a matingly shaped bore in said one movable member, a generally diametrically extending end face formation at the larger end of said plug-like member, and means threadedly associated with the smaller end of said plug-like member and having annular engaging contact with a portion of said one movable member for drawing said plug-like member axially inwardly into said matingly shaped bore into fixed clamp engagement to secure said plug-like member with its end face formation in a selected relative angular position to said movable member and said indexing pin.

13. The socket assembly of claim 12 wherein said end face formation comprises an annular protuberant formation defining a pin end receiving recess.

14. The socket assembly of claim 12 wherein said end face formation comprises a protuberant rib-like formation extending in a generally diametrical direction across said end face and adapted to enter a mating pin end receiving recess.

15. An adjustable multi-position indexing mechanism for use with a rotatable trackway journalled on a radial support arm of a radial arm saw for rotation around a vertical journal axis comprising a multiplicity of socket members rotatably mounted in said trackway in predetermined angularly spaced relation around said journal axis and having socket recesses lying along the path of a circle having said journal axis as a center and in a surface area disposed in opposed relation to a surface area of said radial support arm, each of said socket members comprising a frustum of a cone the larger end of which is diametrically slotted to form a socket recess and the body of which is disposed in a conical opening in said trackway and has its smaller end exposed and centrally apertured and tapped to receive a clamp screw and washer assembly adapted upon threaded assembly of said screw with said cone to abuttingly engage said washer with said trackway and draw said cone axially into tight clamped engagement with the walls of said conical opening to retain said socket member in a predetermined angularly adjusted relation to said trackway; clamp screw and washer assembly means adjustably securing said socket members to said trackway for respective relative rotation with respect to said trackway surface area whereby the angular relationship of said respective socket recesses to said surface area of said trackway may be selectively adjusted; and an indexing pin axially and rotatably mounted in said radial support arm with its axis of rotation normal to said surface area of said trackway and offset to one side of said path of a circle and having an end face formed to matingly cooperate with and shift laterally with respect to said socket recesses whereby upon loosening of the clamp screw and washer assembly means of a selected socket member and engagement of said indexing pin therewith micromatic relative angular adjustment of said trackway relative to said radial support arm around said journal axis may be effected upon rotation of said indexing pin and said socket relative to said trackway.

16. An adjustable multi-position index mechanism for use with a member movable along a trackway extending longitudinally of a supporting member comprising a multiplicity of socket members rotatably mounted in said supporting member in predetermined longitudinally spaced relation with their axes parallel and spaced along the trackway in a common plane and having end faces disposed to oppose said movable member during its relative movement and having diametrical formations therein, each of said socket members comprises a plug-like member having a reduced diameter threaded stem extending away from one end face and a protuberant diametrically extending rib formed on its opposite end face and a clamp nut and washer assembly adapted upon threaded assembly with said stem to abuttingly engage the washer of said nut and washer assembly with a portion of said support member and draw said plug-like member axially into tight clamped engagement with a portion of said support member oppositely directed with respect to said washer engaged portion of said support member to secure said plug-like member in predetermined angularly adjusted relation to said support member and for relative rotation with respect to said supporting member whereby the angular relationship of said respective socket member diametrical end formations to said supporting member may be selectively adjusted; and an indexing pin axially and rotatably mounted in said movable member with its axis of rotation paralleling the axes of said socket members and offset to one side of said common plane and having an end face opposing and formed to matingly cooperate with the diametrical formations of selected ones of said socket member end faces when said movable member is suitably longitudinally related to said support member, said indexing pin being adapted when engaged with a loosened socket member and rotated around its axis to effect related rotation of the engaged socket member and micromatic relative longitudinal adjustment of said movable member relative to said support member and accurate indexing adjustment of said movable member to a predetermined position along said support member.

17. An adjustable multi-position index mechanism comprising two members normally mounted for relative movement along a guided path, a plurality of socket members respectively mounted on one of said movable members for rotation about respective axes, a pin mounted on the other of said relatively movable members for locking engagement and disengagement with said socket members whereby said relatively movable members may be fixed against relative movement in a plurality of selected positions defined by the points of engagement between said pin and each of said socket members, the axis of each of said socket members being offset from the path of movement of the axis of said pin when said relatively movable members are moved relative to each other, and means to independently adjust each socket member about its axis whereby the relative position of said relatively movable members may be independently adjusted at each of said points of engagement between the pin and socket members.

References Cited in the file of this patent

UNITED STATES PATENTS

| | | |
|---|---|---|
| 1,392,128 | Ekman | Sept. 27, 1921 |
| 2,239,260 | Turrettini | Apr. 22, 1941 |
| 2,295,247 | Wessman | Sept. 8, 1942 |
| 2,319,895 | Walker | May 25, 1943 |
| 2,590,119 | Osterhus | Mar. 25, 1952 |
| 2,633,777 | Hoern | Apr. 7, 1953 |
| 2,722,952 | Snyder | Nov. 8, 1955 |
| 2,773,524 | Schutz et al. | Dec. 11, 1956 |
| 2,882,758 | Berthiez | Apr. 21, 1959 |
| 2,930,415 | Cravens | Mar. 29, 1960 |

FOREIGN PATENTS

| | | |
|---|---|---|
| 1,029,769 | France | Mar. 11, 1953 |